(No Model.)

S. MILLER.
HORSE HAY FORK.

No. 314,044. Patented Mar. 17, 1885.

WITNESSES:
Dayin S. Wolcott
C. M. Clarke

INVENTOR.
Samuel Miller.
BY George H. Christy
ATTORNEY.

United States Patent Office.

SAMUEL MILLER, OF PITTSBURG, PENNSYLVANIA.

HORSE HAY-FORK.

SPECIFICATION forming part of Letters Patent No. 314,044, dated March 17, 1885.

Application filed July 18, 1884. (No model.)

*To all whom it may concern:*

Be it known that I, SAMUEL MILLER, a citizen of the United States, residing at Pittsburg, in the county of Allegheny and State of Pennsylvania, have invented or discovered certain new and useful Improvements in Hay-Forks, of which improvements the following is a specification.

Figure 1:
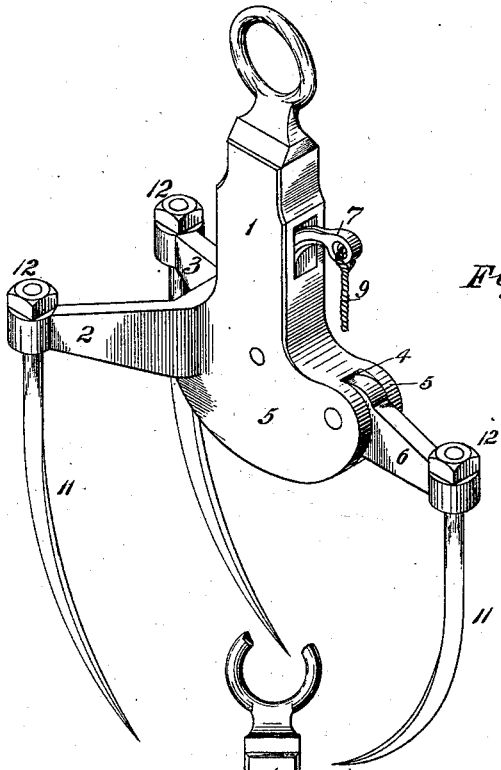
Figure 2:
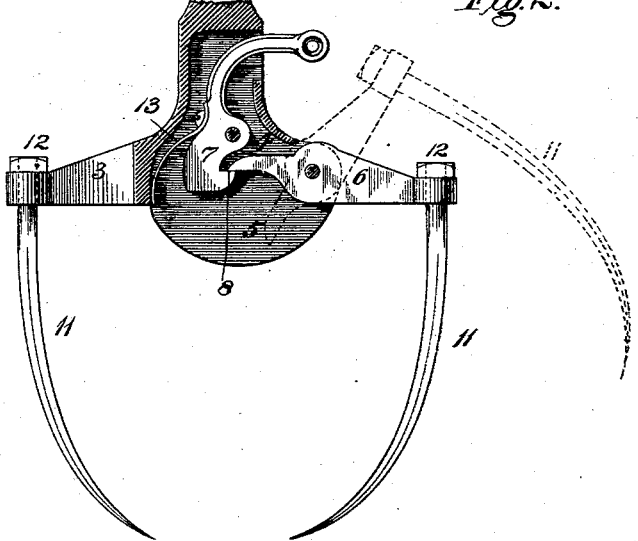

In the accompanying drawings, which make part of this specification, Figure 1 is a view in perspective of my improved hay-fork. Fig. 2 is a view of the same in side elevation, part of the head being broken away to show certain features of construction.

The object of my invention is to so construct such a fork as to be strong, and capable of being quickly operated to grasp and retain a load of hay or straw, and to carry and release the same at any desired point;
and to this end my invention consists in the construction and combination of parts, all as more fully hereinafter described and claimed.

The head or body 1 of the fork is made of malleable iron or steel, and is provided on one side with two arms, 2 and 3, projecting radially from said head and formed integral therewith. On the side opposite the arms 2 and 3 the head is provided with the radial slot 4, which is extended radially by the cheek-pieces 5, formed integral with the head, and between the cheek-pieces is pivoted the arm 6. The inner end of this arm 6 is made in the shape of a beak or bill curved on its upper side, and straight or slightly undercut on the under side. Within the slot 4 is pivoted the trigger or catch 7, having in its lower end the hook or notch 8, adapted to catch over the bill or beak of the arm 6 when said arm is at right angles to the head 1, as shown. The upper end of this trigger or catch is bent outward, and projects out of the slot 4 just above the arm 6, and is provided with an eye in said projecting end, by which to attach a tripping-rope, 9, as shown. On the back of the trigger or catch is attached the spring 13, the face end of which bears against the back of the slot 4 and holds the trigger in such a position that its hooked end will be normally in the path of the movement of the bill or beak of the arm 6. In the outer ends of the arms 2, 3, and 6 are formed holes or sockets, into which are inserted the threaded ends of the curved steel tines 11, said tines being held rigidly in the sockets by the nuts 12. These tines are so arranged that their free ends incline downwardly and inwardly toward a common plane passing through the axis of the head 1.

The operation of my fork is as follows:
The arm 6 having been freed from the catch or trigger 7, said arm is turned upward in the position shown by dotted lines in Fig. 2. The tines secured to the arms 2 and 3 are then forced into a pile of hay. The arm 6, with its tine, is then turned down and the tine forced into the hay until the beak is caught by the hook on the end of the trigger 7. The fork is then raised by any convenient means, such means being usually a rope secured in an eye of the head 1, and passing over a sheave attached to some projecting part of the building in which the hay is to be placed. As soon as the fork with its load of hay has been carried to the desired place the trigger or catch 7 is tripped by pulling down on rope 9, when the load of hay in the fork will push the arm 6 and its tine up out of the way and will drop free of the fork.

I claim herein as my invention—

1. A hay-fork having in combination a head portion, recessed, as described, provided with two rigid radial arms carrying tines, an arm pivoted in said recess, and having a beak-like projection at its inner end and carrying a tine at its outer end, and a spring-catch pivoted to the head within the recess and adapted to engage the end of the pivoted arm, substantially as described.

2. In a hay-fork, the head portion, recessed, as described, and provided with two rigid radial arms having tines secured in their outer ends, in combination with an arm pivoted in said recess, and having a tine secured in its outer end, and a spring catch pivoted within the recess and constructed to hold the arm and tine in operative position, substantially as set forth.

In testimony whereof I have hereunto set my hand.

<div style="text-align:right">his<br>SAMUEL ✕ MILLER.<br>mark.</div>

Witnesses:
    DARWIN S. WOLCOTT,
    R. H. WHITTLESEY.